(12) United States Patent
Seymour et al.

(10) Patent No.: US 11,637,841 B2
(45) Date of Patent: Apr. 25, 2023

(54) ACTIONABILITY DETERMINATION FOR SUSPICIOUS NETWORK EVENTS

(71) Applicant: salesforce.com, inc., San Francisco, CA (US)

(72) Inventors: John Seymour, Bellevue, WA (US); Anuj Gargeya Malkapuram, Union City, CA (US); Prashant Dwarkadas Agrawal, Kirkland, WA (US)

(73) Assignee: Salesforce, Inc.

( * ) Notice: Subject to any disclaimer, the term of this patent is extended or adjusted under 35 U.S.C. 154(b) by 421 days.

(21) Appl. No.: 16/725,819

(22) Filed: Dec. 23, 2019

(65) Prior Publication Data

US 2021/0194896 A1 Jun. 24, 2021

(51) Int. Cl.
| | | |
|---|---|---|
| *H04L 29/06* | (2006.01) | |
| *H04L 9/40* | (2022.01) | |
| *G06F 11/32* | (2006.01) | |
| *G06F 11/30* | (2006.01) | |

(52) U.S. Cl.
CPC ...... *H04L 63/1416* (2013.01); *G06F 11/3072* (2013.01); *G06F 11/327* (2013.01)

(58) Field of Classification Search
CPC . H04L 63/1416; H04L 63/20; H04L 63/1433; H04L 63/1425; H04L 63/145; G06F 21/577
USPC .......................................................... 726/23
See application file for complete search history.

(56) References Cited

U.S. PATENT DOCUMENTS

| | | | |
|---|---|---|---|
| 8,474,012 B2 | 6/2013 | Ahmed et al. | |
| 8,661,037 B2 | 2/2014 | Narang et al. | |
| 9,058,301 B2 | 6/2015 | Agrawal et al. | |
| 9,166,997 B1 * | 10/2015 | Guo ..................... | H04L 63/1433 |
| 9,413,782 B1 * | 8/2016 | Adams ................. | H04L 63/145 |
| 9,632,838 B2 | 4/2017 | Ng et al. | |
| 9,697,548 B1 | 7/2017 | Jaff et al. | |
| 10,135,785 B2 * | 11/2018 | Rolette ............... | H04L 63/0236 |
| 10,150,354 B2 | 12/2018 | Brancaleone et al. | |
| 10,180,085 B2 | 1/2019 | Trippold et al. | |
| 10,418,024 B1 | 9/2019 | Seymour et al. | |
| 10,554,767 B2 | 2/2020 | Hardy et al. | |

(Continued)

FOREIGN PATENT DOCUMENTS

EP 2401839 B1 9/2019

*Primary Examiner* — Longbit Chai
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to reporting for network events within a computer network. A computer system may access a set of data corresponding to a particular network event within a computer network, where the set of data includes captured attributes of the particular network event. The computer system may then calculate, using the set of data, a security score indicative of suspiciousness of the event and an actionability score that is based on an extent to which of a particular group of attributes are missing from the set of data. The computer system may determine, based on the two scores, a combined score for the event. The computer system may then report a notification for the event, based on the combined score. Such techniques may decrease a number of reported events for a network, which may advantageously allow resources to be focused on a smaller set of events.

20 Claims, 8 Drawing Sheets

(56) References Cited

U.S. PATENT DOCUMENTS

| | | |
|---|---|---|
| 10,698,787 B2 | 6/2020 | Agrawal et al. |
| 10,779,112 B2 | 9/2020 | Irani et al. |
| 11,089,049 B2 * | 8/2021 | Hazay ................... H04L 9/3239 |
| 11,165,694 B2 * | 11/2021 | Sanzgiri ................. H04L 45/50 |
| 2011/0246216 A1 | 10/2011 | Agrawal et al. |
| 2017/0026401 A1 * | 1/2017 | Polyakov .............. H04L 63/101 |
| 2018/0340473 A1 | 11/2018 | Agrawal et al. |
| 2018/0349436 A1 | 12/2018 | Agrawal et al. |
| 2019/0139046 A1 | 5/2019 | Boutnaru |
| 2019/0190946 A1 | 6/2019 | Nagaraja et al. |
| 2019/0207821 A1 | 7/2019 | Perkal et al. |
| 2019/0390575 A1 | 12/2019 | Dokic et al. |
| 2020/0151013 A1 | 5/2020 | Agrawal et al. |
| 2020/0175584 A1 | 6/2020 | Agrawal et al. |
| 2020/0383628 A1 | 12/2020 | Borremans et al. |

\* cited by examiner

Actionability Score = $(0.5)^{(2)}$     *Scoring Example 610*

⇩

Combined Score = (0.25) * (95)    } Security Score 602A

⇩

Combined Score = 23.75

⇩

Security Threshold = 50 ≥ Combined Score = 23.75
(Security Alert Not Triggered 604A)

---

Actionability Score = $(0.5)^{(1)}$     *Scoring Example 620*

⇩

Combined Score = (0.50) * (100)    } Security Score 602B

⇩

Combined Score = 50

⇩

Security Threshold = 50 ≥ Combined Score = 50
(Security Alert Triggered 604B)

*Fig. 6*

ACTIONABILITY DETERMINATION FOR SUSPICIOUS NETWORK EVENTS

BACKGROUND

Technical Field

This disclosure relates generally to computer networks, and, more specifically, to computer network security.

Description of the Related Art

Network security systems may monitor various events that occur within a computer network. Events occurring within a computer network may include connections made by host systems or devices of the computer network to domains outside the computer network. A network security system may alert on various connections that it identifies as suspicious. Network connections may be suspicious, for example, if they are associated with a blacklisted domain. These security systems may generate event logs of potentially suspicious activity to be investigated by a system administrator. Manual review of large numbers of logged network events, however, can overwhelm security resources, delay the review process, and potentially allow security breaches to go unchecked.

BRIEF DESCRIPTION OF THE DRAWINGS

FIG. 6 is a diagram illustrating example scoring of network events, according to some embodiments.

Figure 1:
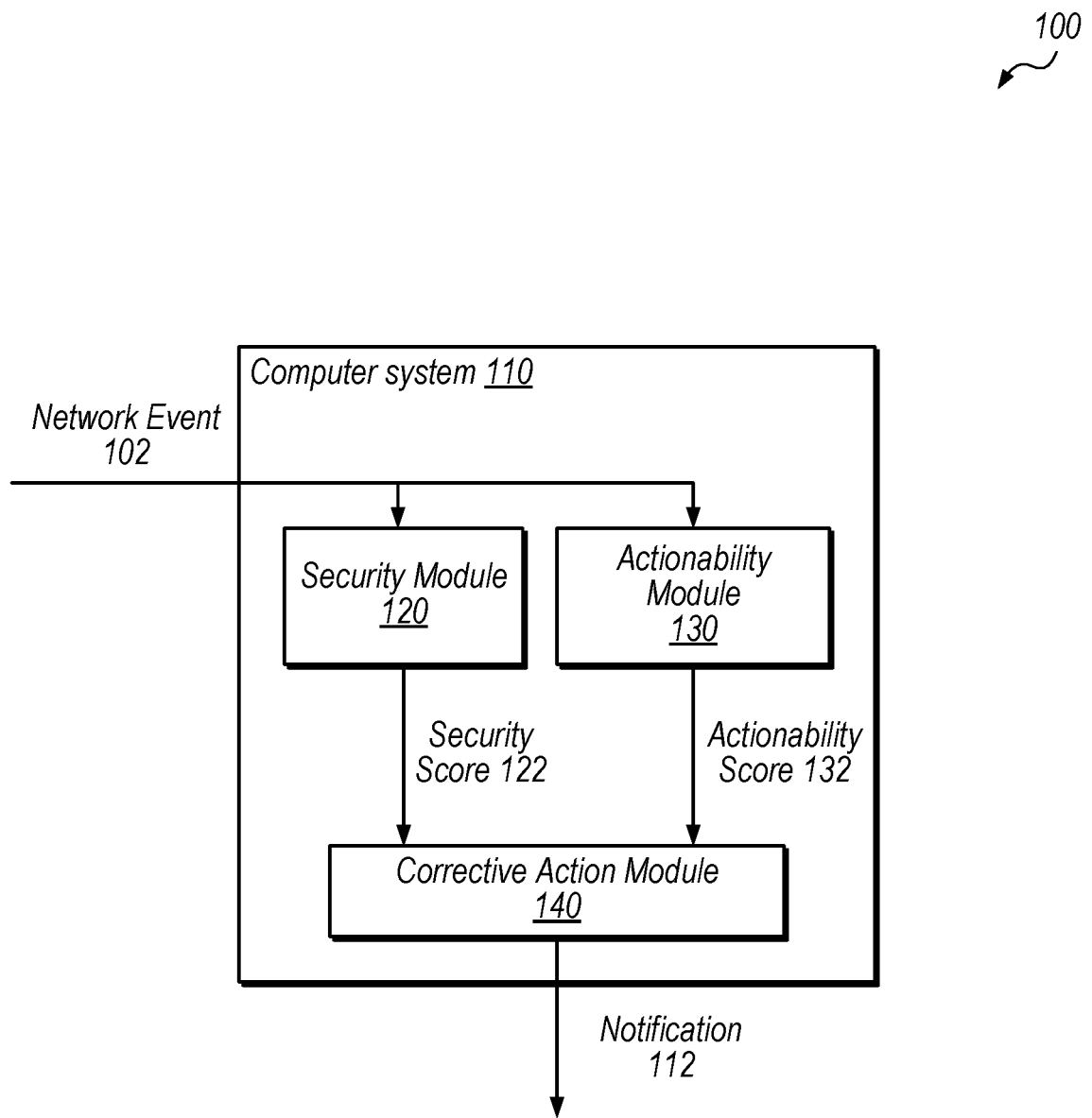
FIG. 1 is a block diagram illustrating an example computer system that generates a notification for a network event based on a security score and an actionability score, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing system configured to send a notification for a particular network event" is intended to cover, for example, a computer system having, for example, a processor, network interface, memory having program instructions, etc. to performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

DETAILED DESCRIPTION

Within a given computer network, a security system may identify one or more host systems or devices that have been compromised, meaning that the host or device is no longer trusted. The security system may in some instances identify compromised hosts by generating event logs of potentially suspicious activity for manual review by a designated reviewer or system administrator. Information for certain events placed in the event logs may correspond to network activity that violates policies of the computer network or indicates an unauthorized user. The number of events included in such logs may be extremely voluminous, however. This size may impede review of events, which in turn may cause security issues for devices or systems operating within the computer network (e.g., when these devices or systems are compromised or vulnerable to attacks). In many cases, the number of events that are flagged by a security system and included in an event log may, as a practical matter, prevent remediation of those events, thus allowing malicious activity to persist. For example, a discrepancy between a volume of reported network events and actual malicious activity may cause system administrators to lose trust in the security system that performed the flagging.

The present inventors have recognized that some current techniques for identifying suspicious network events may flag any event that appears to be a security threat, regardless of whether that threat can actually be acted upon. Consequently, traditional techniques may flag events for which information needed for meaningful further review is missing. Due to such events being included in network logs, time and resources may be wastefully expended, which may result in additional costs and decreased network security.

One approach to reducing the proliferation of network events is the use of whitelists, which are rule sets that specify approved network events. A whitelist, for example, may include a list of domains that are considered trustworthy by a computer network. Accordingly, the computer network may allow access to network resources based on their inclusion on such a list. The present inventors, however, have recognized that reliance on whitelisting presents problems, particularly when a network event that would otherwise have a very high indication of suspiciousness is included on a whitelist. Specifically, whitelisting techniques often preclude malicious events from surfacing or being identified within a computer network. As one example, these techniques may suppress or fail to report on malicious attacks that occur in a computer network due to the domains associated with these attacks being included on one or more whitelists of the computer network. For instance, a malicious user proxying through an internal host to a computer network may be silenced (e.g., may not be reported on) due to whitelisting techniques filtering out network events which occur locally within the computer network even if such events would clearly be identified as malicious by a user or administrator manually monitoring or reviewing network activity. In addition, in some cases, whitelists may be difficult or tedious to maintain. The present disclosure describes various techniques for reducing the number of network events reported for further review, but without some of the drawbacks associated with whitelists.

The present inventors have recognized two separate but related problems: 1) the proliferation of reported network events, and 2) the downside of whitelisting (i.e., automatically approving) certain types of events. In other words, the inventors recognize that while it may be desirable to reduce the number of reported network events, the use of whitelisting can undesirably allow malicious activity to persist.

In order to reduce the number of reported network events, techniques are disclosed for reducing the number of events that are presented for potential investigation using two different security models: one model for determining whether a network event is suspicious and another model for determining whether the network event is actionable. The actionability model examines whether a given network event includes sufficient information to act on the event—for example, whether the event can be replicated or realistically investigated. A prime cause of a lack of actionability may be a loss of data correlation, meaning that a particular event log entry lacks some quantum of information (e.g., a host name is missing). The disclosed network security system determines a combined security score for a network event using the two different models, and when the combined score satisfies a security threshold, a corrective action is taken such as alerting a system administrator. Such techniques may advantageously reduce a number of network events that are reported and potentially queued for manual review. Reducing or removing the need for manual review of various network events may advantageously free up network resources and may improve the efficiency and safety of computer networks.

In some cases, additional criteria may be used to provide reporting accuracy, such as using rules identifying a particular set of known false positive scenarios. These rules may be employed as a sub-component of the actionability model in some embodiments. As noted, while the use of whitelists acts to reduce reported events, in some cases this approach may cause malicious activity from surfacing. By employing rules based on domain-specific false positive scenarios to generate a score that is more granular than a rigid, binary whitelist (which, in effect either has a score of 0 or 1), the reporting of events may be reduced but with the advantage of being more likely to catch malicious activity. Consider an event that is highly suspicious, but which triggers a rule in a whitelist and thus causes the event not to be reported. If a whitelist is not used but the event still triggers a known false positive rule, an indication of the suspiciousness may be reduced—but not entirely overridden as with the whitelist approach.

Example Network Security System

FIG. 1 is a block diagram illustrating an example computer system that generates a notification for a network event based on a security score 122 and an actionability score 132. In the illustrated embodiment, network 100 includes a computer system 110 that in turn includes a security module 120, an actionability module 130, and a corrective action module 140.

Computer system 110, in the illustrated example, receives an indication of a network event 102 from a computer network (this network may also be included in network 100 or may be a different network that interfaces with network 100). Thus, network event 102 is not the event itself, but rather a set of information describing characteristics of the event, which may have been detected at any point within a computer network. Thus, network event 102 may include a set of data with captured attributes associated with the event. Network event 102 may correspond to any of various types of occurrences—for example, the event may be a connection between an application running on a host system (or host device) within a computer network and another computing device, where the host system is within a first domain and the other computing device is within a second, different domain. In some situations, the second domain is external to the computer network on which network event 102 is recorded. The set of data that includes captured attributes of the network event 102 may include both host-based signals and network-based signals, which are discussed below with reference to FIG. 4. As used herein, a "network event" refers to activity or an occurrence within a computer network that is detected by the computer network. The computer network may also detect a set of data for a particular network event. In some cases, a network event is detected based on some action initiated by a system or device, either internal or external to the computer network, that triggers a response from the computer network. For example, a user of a user device may interact with the computer network by entering keystrokes on their keyboard to initiate a connection with another system through the computer network. The computer network may facilitate interactions for network events and may record information for events.

Security module 120, in the illustrated embodiment, receives the network event 102 that includes a set of data with captured attributes and determines a security score 122 for the network event based on the set of data. For example, security module 120 may calculate a security score 122 that indicates the suspiciousness of network event 102 based on domain information for the network event and information associated with one or more applications that are active during the network event. Domain information may include session information and may indicate whether an SSL certificate for the network event 102 is valid. Various types of network information evaluated by security module 120 are discussed in further detail below with respect to FIG. 2.

Actionability module 130, in the illustrated embodiment, receives the network event 102 that includes a set of data with captured attributes and determines an actionability score 132 for the network event based on the set of data. In some embodiments, actionability module 130 determines the actionability score 132 for network event 102 based on a number of particular attributes that are missing from the set of data for the network event. For example, if a client application running on the host device that made the connection for network event 102 is unknown or missing, then actionability module 130 may compute the actionability score 132 in a different manner than if the information were known. In some embodiments, in addition to assessing particular missing attributes for network event data, actionability module 130 determines the actionability score 132 for network event 102 based on performing one or more tests that identify whether the network event is one of a known set of false positives. For example, in the case in which one or more endpoints of the network event 102 are internal to the computer network (rather than outside the computer network), the actionability module 130 may determine that the network event matches a known false positive and thus output an actionability score 132 that makes it less likely that this network event will necessitate corrective action. In some cases, the actionability module 130 might account for instances in which the security module 120 generates a high suspiciousness score for a network event 102 that is known to be a false positive network event.

In some situations, maintaining the actionability module 130 separately from the security module 120 may provide certain advantages. For example, in many cases, security modules may be generic or provided by third parties, which use pretrained models, models trained on other datasets, etc.; this allows for transferring of learning from those other models into the current security context. Accordingly, a generic security module may be implemented separately from an actionability module that may include not only missing data information, but also domain-specific known false positive information. In addition to allowing for transferring of learning, maintaining actionability module 130 and security module 120 separately may prevent or reduce the amount of code duplication. For example, each third-party model may not need to include its own program code for performing missing data and false positive assessments. Rather, the actionability module 130 may be applied in combination with various third-party models to implement these types of assessments. Note that, in many cases, it may be undesirable or non-feasible to modify third-party code.

As used herein, "actionability" is a broad term that refers to the amount of data that is included in the indication of a particular event 102. In some cases, actionability may be measured vis-à-vis some determined set of data fields for a network event. An actionability score may be used to establish actionability along a spectrum (e.g., from 0 to 1, 0 to 10, 0 to 100, etc.). Thus, in one example, if a network event indication includes a threshold number of some determined set of data fields, that event may be deemed to be actionable (e.g., 0.8 of 1 for its actionability score). In this instance, the actionability score may have a low impact on the suspiciousness score. On the other hand, if a network event indication includes less than a threshold number of the determined set of data fields, that event may be deemed to be inactionable (e.g., 0.2 of 1 for its actionability), meaning that the event in many cases will not be reported for corrective action regardless of the suspiciousness score for the event. Generally speaking, the more data that is present for a network event 102, the more likely it is that this event is actionable, such that a network administrator (or a program analyzing network data) is actually able to take meaningful action on the event. The term "actionability" stands in distinction to the suspiciousness of the event. Accordingly, even if an event is highly suspicious, it might be indicated as low on actionability, meaning that some highly suspicious events may not be reported for corrective action.

Corrective action module 140, in the illustrated example, generates a notification 112 that includes a report for network event 102 based on the output of both the security module 120 and the actionability module 130. In some embodiments, notification 112 includes an indication regarding the suspicious nature of the event—e.g., that a host device associated with network event 102 has been infected by malware, violates a data usage policy, etc. In some embodiments, notification 112 includes a combined score generated based on the security score 122 generated by security module 120 and the actionability score 132 generated by module 130. In some embodiments, an administrator of network 100 may perform a manual review of network event 102 based on the notification 112 provided by computer system 110. In some embodiments, corrective action module 140 implements one or more rules or performs one or more actions to correct security issues introduced by network event 102.

Example Computer Network

Figure 2:
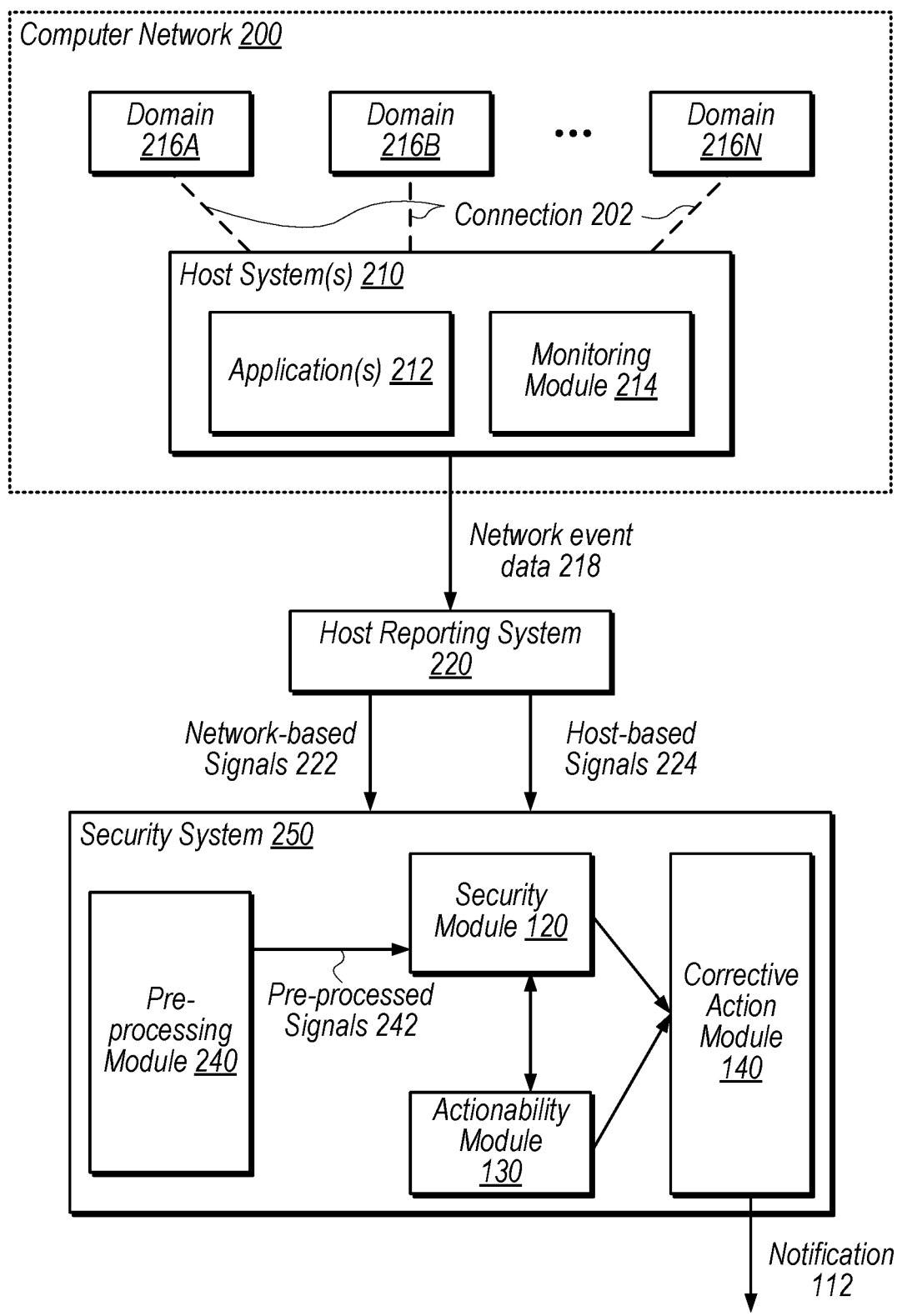
FIG. 2 is a block diagram illustrating an example security system used to generate notifications for network events that occur within a computer network, according to some embodiments.

FIG. 2 is a block diagram illustrating an example security system used to generate notifications for network events that occur within a computer network. In the illustrated embodiment, computer network 200 provides network event data 218 to a host reporting system 220 that interfaces with a security system 250 for monitoring the security of host system(s) 210 within computer network 200.

Computer network 200, in the illustrated embodiment, includes host system(s) 210 that may attempt a connection 202 to one or more domains 216 to trigger a network event. Computer network 200 may include any number of different host systems or devices that may initiate connections with different domains 216. Note that computer network 200 may be an internal network of a business or corporation. In some situations, host reporting system 220 and security system 250 are included in computer network 200 and monitor the network internally.

A particular host system 210, in the illustrated example, includes one or more applications 212 and a monitoring module 214. Host system(s) 210 may be any sort of computer, e.g., a laptop, a phone, a server, etc. that is connected to the computer network 200 of a business that employs the users of host system(s) 210.

Monitoring module 214 of one of host systems 210 monitors activity of the host system and reports information associated with one or more connections 202 attempted by the host system e.g., with domains 216. For example, monitoring module 214 may be a firewall or some sort of network security system that provides a barrier between computer network 200 and systems external to the computer network. Specifically, monitoring module 214 may provide information specifying whether a connection 202 between a host system 210 and one of domains 216 was successful or blocked by the firewall, a user initiating the connection 202 (e.g., a host system 210), a domain 216 connected to by a host system 210, an application 212 used for the connection, etc.

One or more application(s) 212 may be executable by a host system 210 to initiate a connection 202 with systems that are external to computer network 200. For example, an application 212 may request to view a web page associated with one of domains 216 to allow a user of a host system 210 to view content displayed via the web page. Note that various examples included herein describe connections between a host system and domain that are scored, but these examples are discussed for purposes of explanation and are not intended to limit the scope of the present disclosure. In other embodiments, any of various types of network events may be scored.

Host reporting system 220, in the illustrated example, generates different signals 222 and 224 for network events based on network event data 218. In some embodiments, host reporting system 220 receives network event data 218 from one or more systems that interface with computer network 200. Host reporting system 220 sends signals 222 and 224 to security system 250. In some embodiments, host reporting system 220 is included in computer network 200. Signals generated by host reporting system 220 are discussed in further detail below with reference to FIG. 5.

Security system 250, in the illustrated example, includes pre-processing module 240 for providing pre-processed signals 242 to security module 120. For example, pre-processing module 240 may be a machine learning module that determines whether a domain name associated with a particular network event 102 was generated using a domain name generation algorithm (DGA). In this example, pre-processing module 240 sends the determination (signals 242) whether the domains associated with network events 102 were generated using a DGA to the security module 120. In some embodiments, pre-processed signals 242 are used in calculating security and actionability scores. For example, a network event that is associated with a domain generated by a DGA may be more suspiciousness than network events associated with non-DGA domains. In some embodiments, pre-processing module 240 excludes network events associated with domains that were not generated using a DGA (e.g., module 240 may remove such network events from the evaluation process). For example, if a domain was not generated using a DGA, then the network event associated with that domain may have a lower likelihood of suspiciousness. Note that security system 250 is one example of the computer system 110 shown in FIG. 1.

Security module 120, in the illustrated example, receives pre-processed signals 242 from pre-processing module 240. Security module 120 may also receive various other signals, such as network-based signals 222 and host-based signals 224 and may determine a security score 122 for a network event 102 based on these signals. For example, security module 120 may receive any suitable type of information, including, but not limited to, one or more of the following: session information (e.g., initial/average/total session size, total number of connections, etc.), whether an SSL certificate for the event was valid, client application activity during the network event, one or more client applications that share characteristics with the network event (e.g., applications that share the source and destination of the IP address associated with the network event or the source and destination of the port used for the network event), information specifying whether one or more domains associated with a network event are non-existent domains (e.g., a domain name server (DNS) cannot resolve a domain name from a presented IP address or the domain name is not currently registered with a DNS), whether domains associated with an event are associated with prior suspicious activity, a number of days that a host system made a connection 202 with a particular domain, etc.

Example Actionability Module

Figure 3:
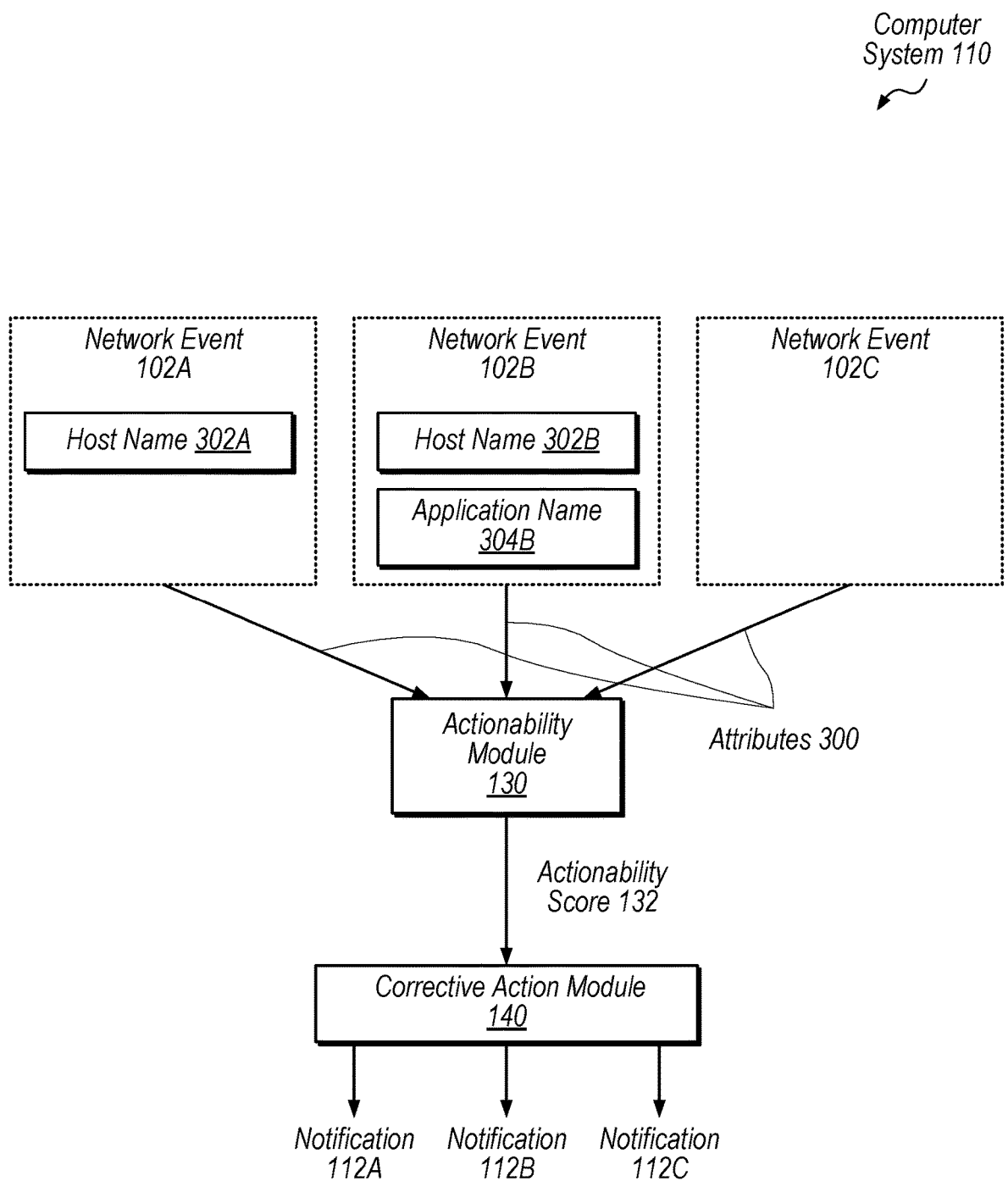
FIG. 3 is a block diagram illustrating example notifications generated for network events based on their respective attributes, according to some embodiments.

FIG. 3 is a block diagram illustrating example notifications 112 generated for network events 102 based on their respective attributes. In the illustrated embodiment, computer system 110 provides attributes 300 for network events 102 to actionability module 130.

Network event 102A, in the illustrated example, includes a host name 302A for a host system on which an application initiating a network connection 202 is running. Note that network event 102B also includes an application name 304B for the application initiating the network connection 202. Network event 102C is missing both of the particular attributes included for network event 102B. For network event 102C, if the IP address listed for this network event does not match the IP address from which the hostname of the network event is obtained, then the security system may be unable to determine a proper hostname for the event. In the illustrated embodiment, the attributes for each network event 102 are sent to actionability module 130 by computer system 110 for scoring of the network event.

Ideally, an event log would list a user associated with a network event and a system administrator reviewing the event would contact the user to obtain additional information about the network event. If the user information is readily available for the network event, this may increase the likelihood that the network event is actionable. In some embodiments, a network event may be missing such user information. In such situations, a system administrator would not be able to obtain information necessary for performing further review and, therefore, the network event may be associated with a decreased likelihood of actionability.

In some embodiments, domain information (e.g., a domain risk score that indicates whether this domain has been used for malicious activity) is missing for a particular network event. For example, if a domain associated with a network event is new or has not yet been evaluated by a domain evaluation system (e.g., due to the system being down, the domain being changed since a prior evaluation by the system, etc.), then this domain may be associated with a lower likelihood of actionability.

Actionability module 130, in the illustrated example, scores network events 102 according to a number of missing attributes for the respective events. Determining an actionability score based on missing attributes is discussed in further detail below with reference to FIGS. 4 and 5. Note that various other types of missing attributes may be used to score a particular network event and that determining an actionability score is not limited to the examples of missing attributes discussed herein.

The scoring performed by actionability module 130 is based on a number of available attributes 300 for a particular network event such that this score penalizes notifications for events with data correlation loss issues. For example, if there is not enough information for a suspicious network connection for an administrator to investigate, then the system is less likely to alert a system administrator for this connection (e.g., even if the domain is suspicious). As one specific example, if an application name cannot automatically be extracted for network event 102A the computer system 110 may determine that the investigation cost outweighs the probability of malicious activity for this event.

Corrective action module 140, in the illustrated example, sends notifications 112 for each of the network events 102A, 102B, and 102C to a system administrator based on the actionability score received from actionability module 130. Corrective action module 140 may send notifications based on a combination of the actionability score calculated by actionability module 130 and the security score calculated by security module 120.

In some embodiments, actionability module 130 scores the three network events differently depending on a tenant of a multi-tenant database system who is initiating the network event via their host device. For example, actionability module 130 may assign a higher score to a network event associated with a first tenant than a network event associated with a second tenant that has the same attributes as the network event for the first tenant. In some embodiments, corrective action module 140 includes different actionability thresholds for one or more tenants and sends types of notifications 112 for network events based on their actionability score meeting their respective actionability thresholds.

Figure 4:
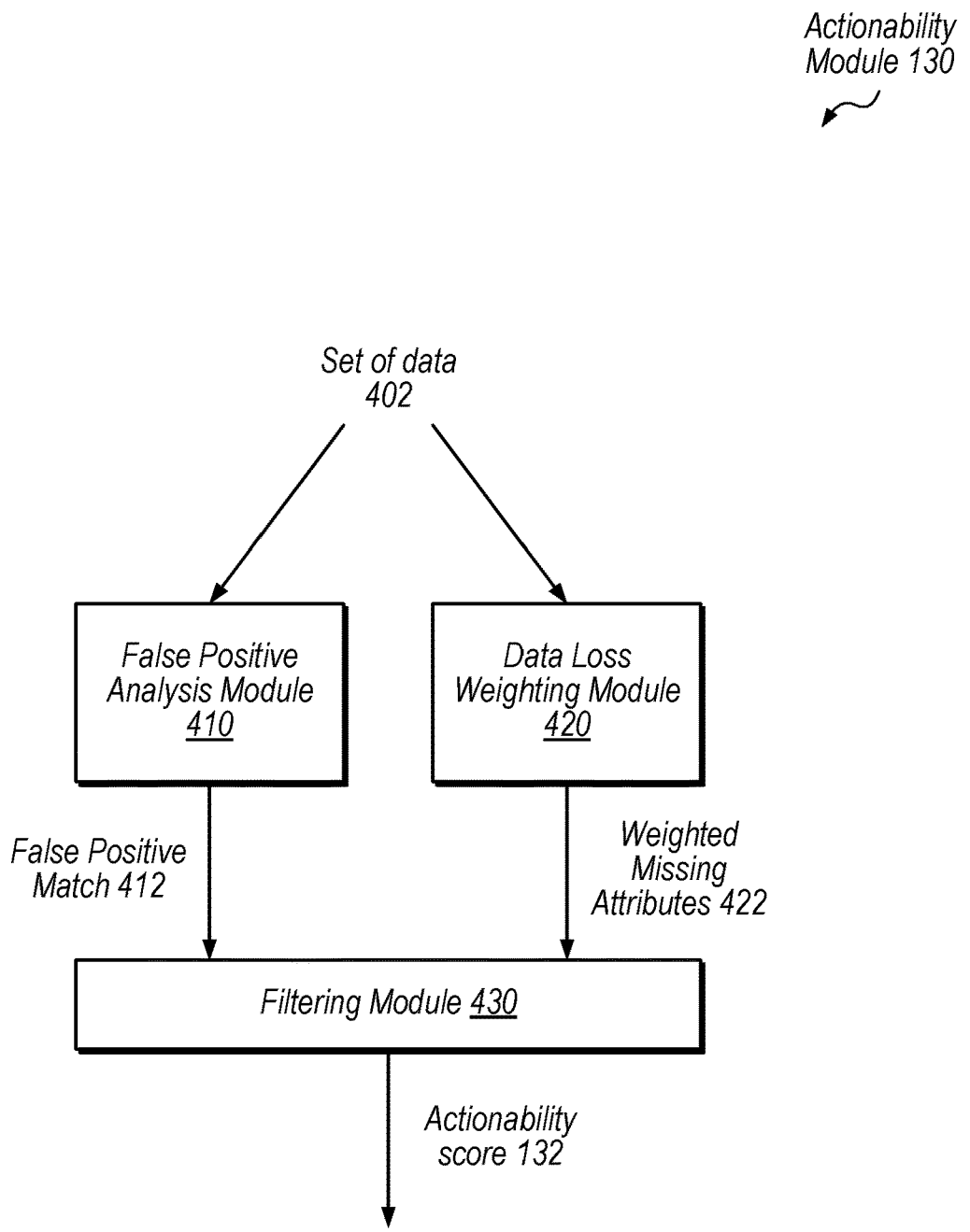
FIG. 4 is a block diagram illustrating an example actionability module for determining actionability scores based on missing attributes for network events, according to some embodiments.

FIG. 4 is a block diagram illustrating an example actionability module for determining missing attributes for network events. In the illustrated embodiment, actionability module 130 includes a false positive analysis module 410, data loss weighting module 420, and a filtering module 430 for generating an actionability score 132.

False positive analysis module 410, in the illustrated embodiment, receives a set of data 402 for a network event 102 and performs a set of tests to determine whether this event matches known false positive events. For example, false positive analysis module 410 may determine whether network activity associated with the network event is a low priority or is unlikely to be a threat to the computer network 200. Set of data 402 may include one or more of the following for a network connection: information specifying whether the connection to a domain was actually established, information specifying whether the domain connection was through a web browser or web application of the host device, whether the IP destination address for the connection is internal or external to the network, a name of the application initiating the connection, a name of the host device (e.g., an IP source), whether the connection was blocked by one or more firewalls, etc. Note that various other types of information may be included in the set of data 402 and that this set of data is not limited to the examples discussed herein.

As one specific example, a network event may be identified by false positive analysis module 410 as a known false positive if it involves beaconing of the host device to a system-owned resource (i.e., the IP address for both the source and destination are internal to the computer network). As another example, if a network connection is blocked by a set of rules included in a firewall of the computer network, then this network connection may be identified as a known false positive (e.g., applications directing connections through an anonymity network, such as the Tor network). In some situations, a network event is identified as a false positive if a domain connected to by a host device is a known benign domain (e.g., exists on a whitelist). As yet another example, the application initiating a network connection may be a web browser on the host device, in which case false positive analysis module 410 may identify the network connection as a false positive.

Data loss weighting module 420, in the illustrated example, also receives set of data 402 for the network event 102 and generates weighted missing attributes 422. For example, module 420 assigns a weight to each missing attribute based on the importance of that missing attribute for manual investigation (e.g., how this missing attribute affects whether the network event is actionable) and provides this information to filtering module 430 for scoring. As one specific example, if the security system 250 is unable to identify an application initiating the connection, then a system administrator may be unable to determine if this connection involves malicious activity during investigation and may get stuck in the review process. In some embodiments, the outputs of the false positive analysis module 410 and the data loss weighting module 420 are input to each other. For example, the weights assigned to missing attributes may be considered by false positive analysis module when determining whether the network event is a match for previously identified false positive network events.

Filtering module 430, in the illustrated embodiment, determines an actionability score 132 for a network event 102 based on a false positive match 412 and weighted missing attributes 422. For example, filtering module 430 generates a score that will increase the chances of an alert being generated for network event 102 if there is a false positive match or if weights for missing attributes are high. Filtering module 430, in the illustrated example, determines an actionability parameter based on the number of false positives and the number of weighted missing attributes 422. Filtering module 430 then calculates the actionability score 132 using the determined actionability parameter, as discussed below with respect to FIG. 6.

In some embodiments, actionability module 130 receives one or more whitelists. For example, actionability module 130 may evaluate network events based on an analysis of data correlation loss, known false positive information, and whitelist information to generate actionability scores 132 for such network events. In such instances, an actionability score may be referred to as an investigation score that is determined based on a data correlation loss score, a known false positive score, a whitelist score, etc. and that indicates on a spectrum whether a network event should be investigated further.

Actionability module 130 may be used in combination with any of various network security scoring modules to weight the scores generated by these modules. This may, in some situations, advantageously reduce or remove the need for additional training for various other network security scoring modules. Actionability module 130 may advantageously involve less overall maintenance than individual whitelists or blacklists.

In some situations, maintaining the actionability module 130 separately from the security module 120 may reduce the amount of training for the actionability module relative to a single module that incorporates both the actionability logic and the security logic. In some cases, this may be due to data correlation loss issues being less likely to change over time than other security issues. For example, within a computer network, a particular security issue my become irrelevant within a particular time interval and, therefore, the security logic for the security module may need to be updated (or the security module may require further training). In contrast, a data correlation loss issue (such as a missing host name) may remain relevant within the particular time interval for determining actionability for network events.

In some cases, network traffic may be routed through domains that are included on whitelists or are otherwise known to be safe to the computer network in order to obscure malicious activity. In such situations, unlike rigid, binary whitelists that miss this malicious activity (in general, security systems ignore traffic being routed through domains included on such whitelists), actionability module 130 will assess the network traffic and generate a comprehensive actionability score based on data correlation loss issues, known false positives, whitelists, etc. rather than immediately throwing out such activity.

Example Host Reporting System

Figure 5:
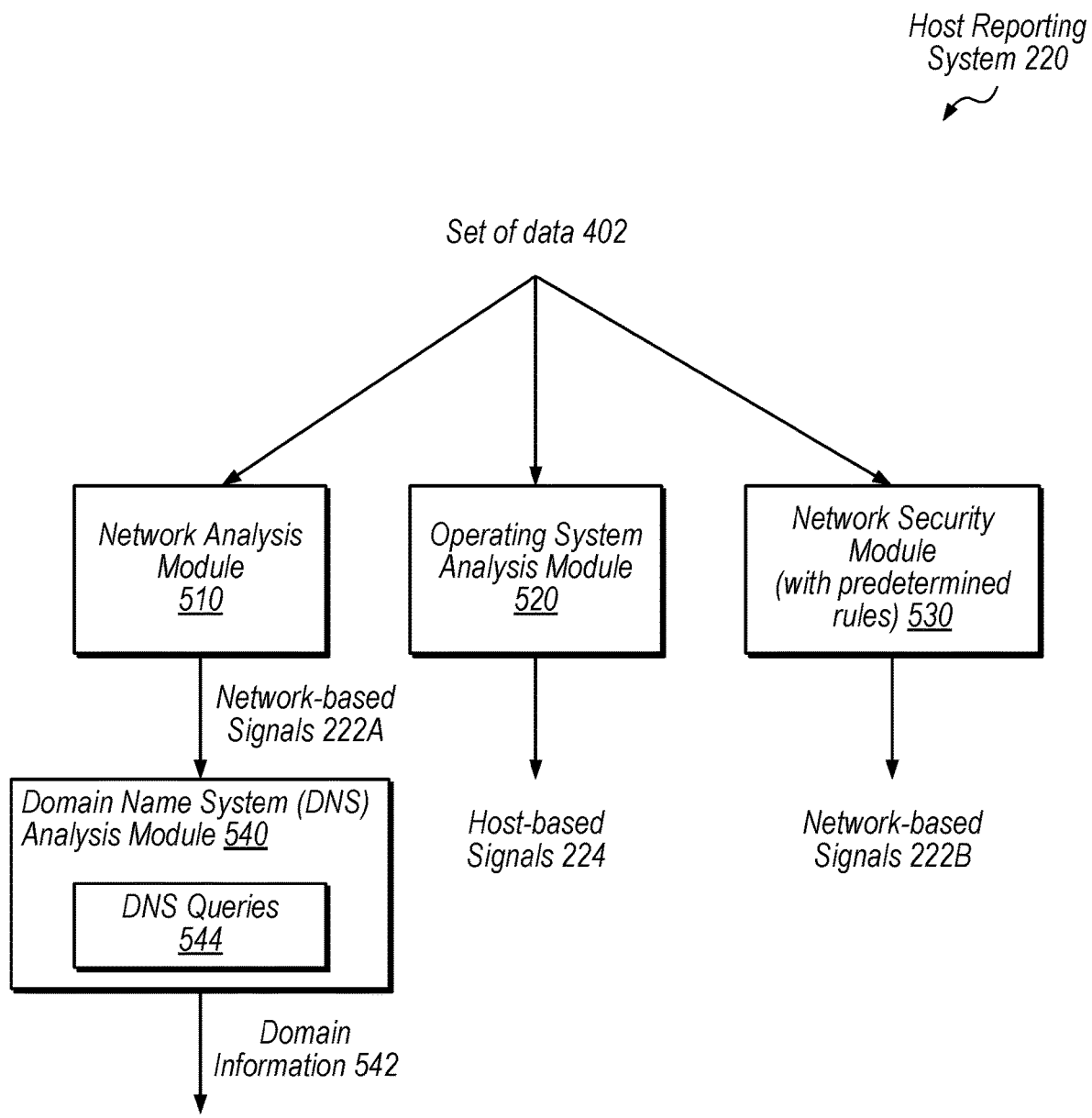
FIG. 5 is a block diagram illustrating an example host reporting system that generates attributes for a network event based on data received from the computer network, according to some embodiments.

FIG. 5 is a block diagram illustrating an example host reporting system that generates attributes for a network event based on data received from the computer network. In the illustrated embodiment, host reporting system 220 includes modules 510, 520, 530, and 540 for generating network-based signals 222, host-based signals 224, and domain information 542.

Network analysis module 510, in the illustrated embodiment, processes a set of data 402 for a network event 102 and determines a first set of network-based signals 222A for the event. For example, network analysis module 510 may be software that is separately executable from host system 210 to monitor events initiated by the host system to generate network-based signals 222A. One example of a network analysis framework included in network analysis module 510 is Zeek. Network-based signals 222A may include one or more of the following: session information (e.g., session size, number of connections, SSL certificate validation, etc.), domain information (e.g., domain names such as Salesforce.com), etc.

Operating system analysis module 520, in the illustrated embodiment, receives a set of data 402 for a network event 102. Based on the received set of data 402, operating system analysis module 520 collects host data by identifying various applications running on the host system 210, connections made by the host system to systems outside computer network 200 (e.g., IP address source and destination, and port source and destination), browser plugins used by the host system, an amount of time the host system has been connected to one or more domains (e.g., more than a threshold number of days may be suspicious), etc. For example, operating system analysis module 520 may identify a client application running on host system 210 that initiated the network event 102. Examples of operating system analysis module 520 used to generate host-based signals 224 for a network event include various types of endpoint detection and response (EDR) security systems (e.g., OSQuery). Operating system analysis module 520 may monitor one or more devices connecting to computer network 200 to ensure that they are complying with one or more network standards.

Network security module 530, in the illustrated embodiment, includes predetermined rules for assessing whether to automatically block a network connection initiated by host system 210. For example, network security module 530 may be a firewall that monitors traffic to and from computer network 200. In some embodiments, network security module 530 is included in the monitoring module 214 of host system 210. Network security module 530 generates network-based signals 222B that specify whether a network connection was blocked, the user or host system 210 initiating the connection, etc. for a particular network event 102.

Domain name system (DNS) analysis module 540, in the illustrated embodiment, generates domain information 542 for network event 102 based on network-based signals 222A provided by network analysis module 510. DNS analysis module 540 may be a domain reputation server that processes DNS queries 544 for millions of different host systems and provide DNS lookup information for these systems. In some situations, module 540 may provide domain information 542 related to phishing protection (e.g., DNS hijacking or redirection). This domain information 542 may be obtained from DNS queries and may be used to score network events. Domain information 542 provided by module 540 for a network event may include DNS lookup information, a probability that a domain associated with a network event was generated using a DGA, whether the domain is associated with malicious activity, whether the domain is a non-existent domain (NXDomain), whether the domains was previously an NXDomain but is now resolved to an IP address, WHOIS information, etc.

Example Network Security System Scoring

FIG. 6 is a diagram illustrating examples 610 and 620 of scoring network events. In the illustrated embodiment, two different example network events are scored using an actionability equation and a combined score equation.

Actionability module 130 generates an actionability score 132 using the actionability equation that includes a penalization parameter ($\lambda$) raised to the power of an actionability parameter alpha ($\alpha$). In addition, security system 250 generates a combined score for a particular network event using the combined score equation. Specifically, the two scores are multiplied to generate the combined score.

$$\text{Score}_{Actionability} = \lambda^{\alpha} \quad (1)$$

$$\text{Score}_{combined} = \text{Score}_{Actionability} * \text{Score}_{Security} \quad (2)$$

Actionability module 130 selects a penalization parameter, lambda ($\lambda$), based on the desired rate of decay and an actionability parameter, alpha ($\alpha$), based on the number of attributes missing from a set of data for a particular network event. In some embodiments, the actionability parameter is determined based on the combination of missing attributes and the number of attributes that match known false positives. In some embodiments, the penalization parameter is a value between 0 and 1. In some situations, the penalization parameter is selected by a system administrator to be closer to 1. For example, a penalization parameter closer to 1 may increase the number of network events reported for further review, including network events that may be of lower priority (e.g., due to a lower likelihood of suspiciousness or actionability). In contrast, a penalization parameter that is closer to 0 may be selected, such that less network events are reported for further review e.g., in situations where time and resources for performing such review are limited. As one specific example, when one attribute is missing for a network event and one attribute indicates that the network event is a known false positive, then the actionability parameter is 2. In this specific example, the penalization parameter is selected to be 0.5 and the resulting actionability score is 0.25 (i.e., 0.5 squared). Network event 102B, shown in FIG. 3 is not missing any particular attributes and, therefore, the actionability parameter for this network event is 0 (assuming that this network event does not include attributes that are known false positives). In this example, the penalization parameter 0.5 will be raised to the power of 0, resulting in an actionability score of 1 for network event 102B. Therefore, the actionability score of 1 will not affect the combined score for network event 102B.

In scoring example 610 actionability module 130 determines an actionability score 132 using a penalization parameter of 0.5 and an actionability parameter of 2 based on a network event missing two particular attributes. The actionability score 132 is then used to determine a combined score by the corrective action module 140. In the illustrated embodiment, the combined score is determined by multiplying the actionability score (0.25) by the security score 602A for the network event (determined by the security module 120 to be 95). The combined score for the network event in the illustrated embodiment is 23.75, which is then compared to a security threshold to determine whether to report the network event for further review. As one example, the security threshold may be 50 and thus the network event combined score of 23.75 does not satisfy the security threshold and the security system 250 does not trigger a security alert 604A on the event. In contrast, if the actionability score of the present disclosure were not being used, then this network event would be reported in spite of missing potential important data that would be needed to actually investigate the event further.

As another example, the actionability score may be determined for a different network event such as network event 102A where only one particular attribute from a set of attributes for the network event is missing. In scoring example 620, with a penalization parameter of 0.5, actionability module 130 determines that the actionability score is 0.5. Further, the combined score for this network event, based on a security score 602B of 100, would be 50. In this example, the combined score for the network event satisfies the security threshold of 50 and, therefore, security system 250 sends a notification to perform further review for the network event (i.e., a security alert is triggered 604B).

Figure 7:
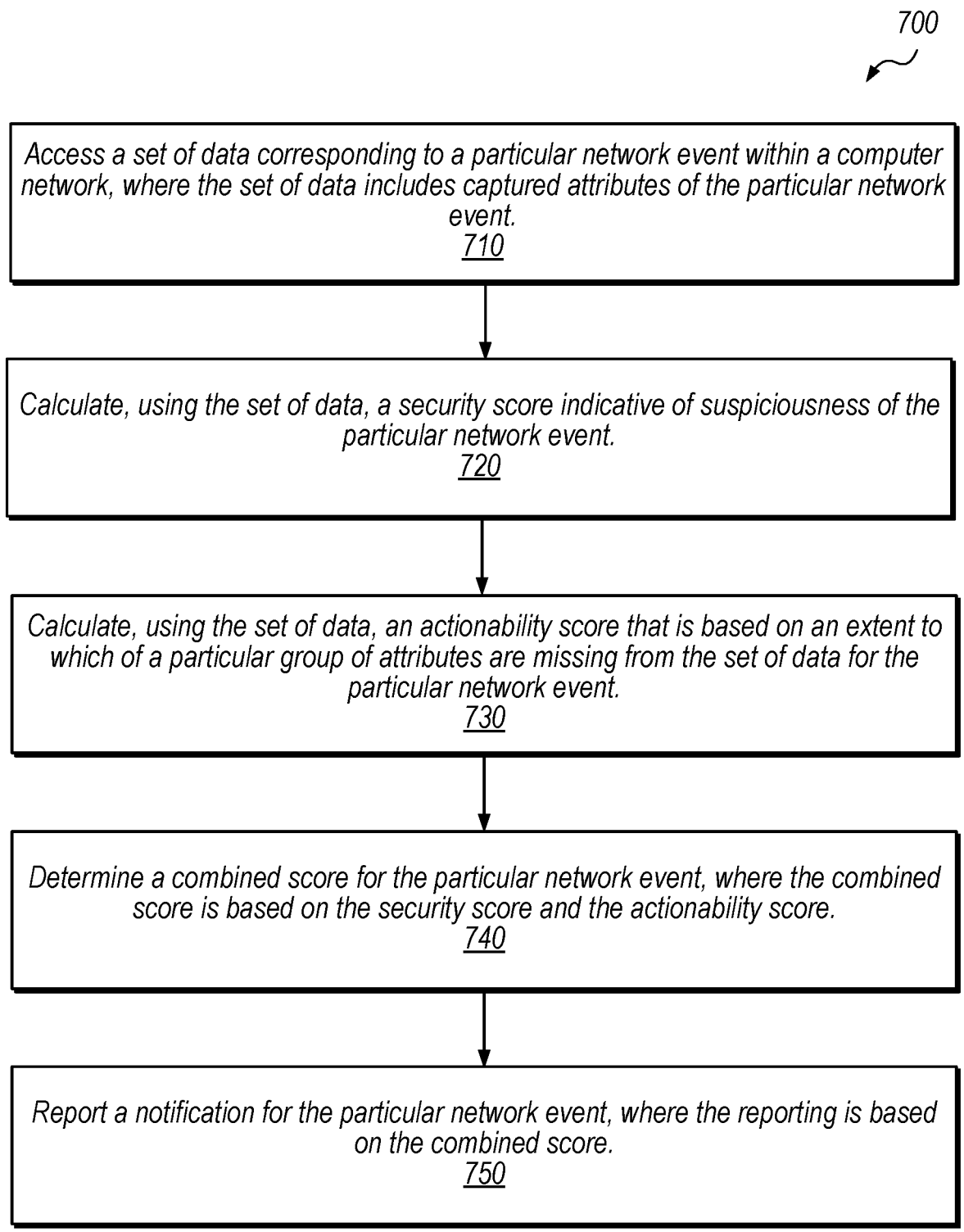
FIG. 7 is a flow diagram illustrating a method for reporting on a network event based on an actionability score that is indicative of missing network event attributes and a security score that is indicative of suspiciousness, according to some embodiments.

In some embodiments, lambda is chosen to be 0.25 instead of 0.5. For example, the network event scored in scoring example 610 would have an actionability score of 0.0625 if lambda were 0.25. In this example, the combined score for the network event would be 5.9375. In some embodiments, combined scores for network events are used to prioritize or rank network events for further review. The network event combined score of 5.9375 would most likely indicate in a log of network events that this event is of low priority.
Example Method Turning now to FIG. 7, a flow diagram illustrating a method 700 for reporting on a network event based on an actionability score that is indicative of missing network event attributes and a security score that is indicative of suspiciousness. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a computer system accesses a set of data corresponding to a particular network event within a computer network, where the set of data includes captured attributes of the particular network event. In some embodiments, the network event involves a host computer system, where the particular group of attributes includes one or more the following attributes: a host name of the host computer system, a domain name of a domain connected to by the host computer system during the network event, an application used by the host computer system during the network event. In some embodiments, the host computer system connects to a domain (e.g., "domain.com") using a web browser.

At 720, the computer system calculates, using the set of data, a security score indicative of suspiciousness of the particular network event. In some embodiments, the computer system compares the security score to a security threshold to determine whether the suspicious network event warrants further review.

At 730, the computer system calculates, using the set of data, an actionability score that is based on an extent to which of a particular group of attributes are missing from the set of data for the particular network event. In some embodiments, the actionability score is calculated based on the value $\lambda^\alpha$, where $\lambda$ is a penalization parameter, and $\alpha$ indicates a number of a set of tests that fail for the particular network event. In some embodiments, the set of tests include tests that indicate whether attributes of the particular group of attributes are missing from the set of data. In some embodiments, the penalization parameter is a value between 0 and 1. For example, if the actionability score of a particular network event is small, it may lower the chances of the event being alerted on by penalizing the overall suspiciousness of the network event.

In some embodiments, the particular group of attributes includes a host name attribute indicating a name of a host computer system associated with the particular network event, where the actionability score is decreased in response to the host name attribute being absent from the set of data for the particular network event. In some embodiments, the particular group of attributes includes an application name attribute indicating an application used by a host computer system during the particular network event, where the actionability score is decreased in response to the application name attribute being absent from the set of data for the particular network event.

In some embodiments, calculating the actionability score is further based on a set of tests that identify whether the particular network event is one of a known set of false positives. In some embodiments, the known set of false positives includes an event in which one or more endpoints of the particular network event are internal to the computer network. In some embodiments, identifying whether the particular network event is one of a set of known false positives includes determining if one of the captured attributes of the set of data specifies whether a connection for the network event was successful. For example, if the connection was unsuccessful, then the network event may not warrant further review.

In some embodiments, the computer system separately maintains a security model for generating the security score and an actionability model for generating the actionability score, where the computer system is configured to permit different values of λ to calculate actionability scores for different organizations using the computer system. For example, for a tenant of a first organization the computer system may use a value of 0.25 for λ when calculating an actionability score, but for a tenant of a second organization the computer system may use a value of 0.5 for λ when calculating an actionability score.

At 740, the computer system determines a combined score for the particular network event, wherein the combined score is based on the security score and the actionability score. In some embodiments, the combined score is determined in a manner in which the combined score exponentially decreases relative to a number of the particular group of attributes that are missing from the set of data. In some embodiments, the combined score is determined by multiplying the security and actionability scores.

At 750, the computer system reports a notification for the particular network event, wherein the reporting is based on the combined score. In some embodiments, the notification along with information associated with the particular network event is placed into a log of suspicious network events for manual review by a system administrator. In some embodiments, the notification includes the combined score and is sent directly to a system administrator.

Considering missing attributes and known false positives for network events when determining whether to alert on a network event may advantageously reduce the number of events that are presented in an event log for potential investigation. In some embodiments, reducing the number of network events presented in an event log advantageously leads to better use of security resources for the computer network.

Example Computing Device

Figure 8:
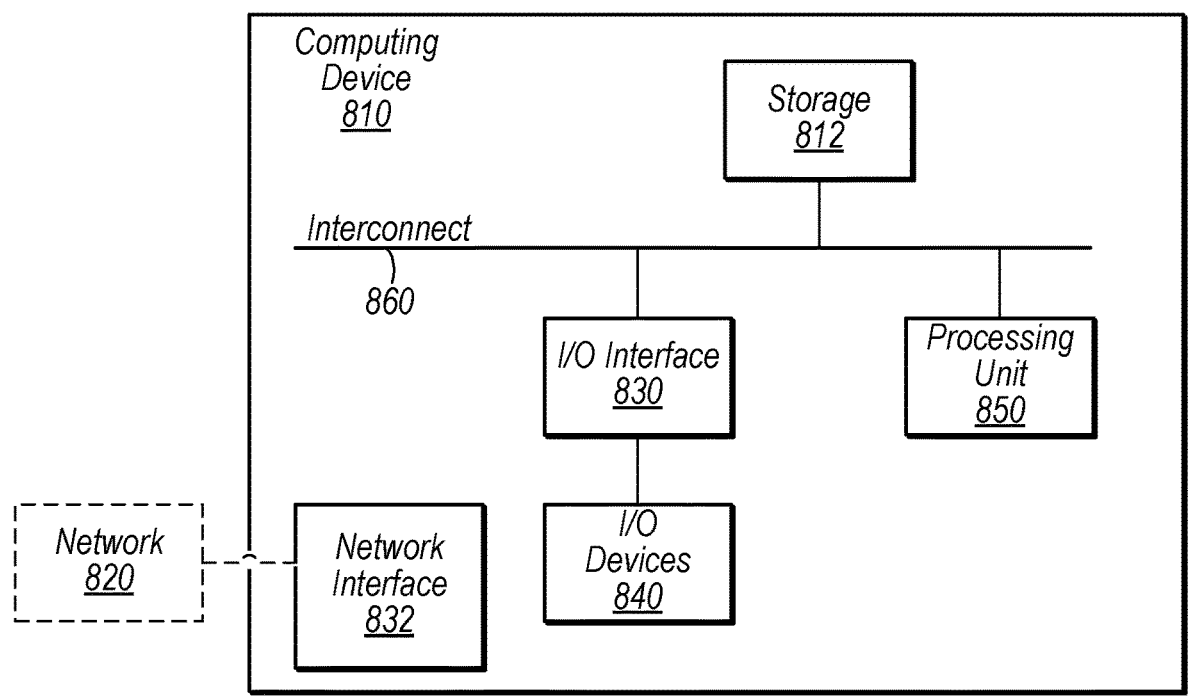
FIG. 8 is a block diagram illustrating an example computing device, according to some embodiments.

Turning now to FIG. 8, a block diagram of a computing device (which may also be referred to as a computing system) 810 is depicted, according to some embodiments. Computing device 810 may be used to implement various portions of this disclosure. Computing device 810 is one example of a device that may be used as a mobile device, a server computer system, a client computer system, or any other computing system implementing portions of this disclosure.

Computing device 810 may be any suitable type of device, including, but not limited to, a personal computer system, desktop computer, laptop or notebook computer, mobile phone, mainframe computer system, web server, workstation, or network computer. As shown, computing device 810 includes processing unit 850, storage subsystem 812, and input/output (I/O) interface 830 coupled via interconnect 860 (e.g., a system bus). I/O interface 830 may be coupled to one or more I/O devices 840. Computing device 810 further includes network interface 832, which may be coupled to network 820 for communications with, for example, other computing devices.

Processing unit 850 includes one or more processors and, in some embodiments, includes one or more coprocessor units. In some embodiments, multiple instances of processing unit 850 may be coupled to interconnect 860. Processing unit 850 (or each processor within processing unit 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

As used herein, the term "processing unit" refers to circuitry configured to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 812 may consist solely of volatile memory in some embodiments. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In some embodiments, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 8 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for prioritizing network events for which a security review is performed, the method comprising:
   accessing, by a computer system, a set of data corresponding to a particular network event that involves a host computer system and occurs within a computer network, wherein the set of data includes captured attributes of the particular network event;
   scoring, by the computer system, the particular network event, including by:
      calculating, using the set of data, a security score indicative of suspiciousness of the particular network event;
      calculating, using the set of data, an actionability score indicative of whether there is sufficient data to take action to remediate the particular network event, independent of the security score for the particular network event, wherein the actionability score is based on an extent to which a particular group of attributes are missing from the set of data for the particular network event, wherein the particular group of attributes includes at least a domain name of a domain connected to by the host computer system during the particular network event;
      determining, by the computer system, a combined score for the particular network event, wherein the combined score is based on the security score and the actionability score; and
   repeating the scoring, by the computer system, to compute combined scores for other network events of a group of network events within the computer network;
   prioritizing, by the computer system, network events within the group of network events for security review based on respective combined scores for those network events; and
   reporting, by the computer system, notifications for one or more of the prioritized network events within the group of network events, wherein the reporting is based on the combined score.

2. The method of claim 1, wherein the combined score is determined in a manner in which the combined score exponentially decreases relative to a number of the particular group of attributes that are missing from the set of data.

3. The method of claim 1, wherein the actionability score is further calculated based on:
   assigning, according to an importance of missing attributes for manual investigation of the particular network event, different weights to attributes that are missing from the set of data.

4. The method of claim 3, wherein the actionability score is calculated based on the value $\lambda^\alpha$, wherein $\lambda$ is a penalization parameter, and $\alpha$ indicates a number of a set of tests that fail for the particular network event, wherein the set of tests include tests that indicate whether attributes of the particular group of attributes are missing from the set of data.

5. The method of claim 4, wherein the penalization parameter is a value between 0 and 1.

6. The method of claim 1, wherein calculating the actionability score is further based on a set of tests that identify whether the particular network event is one of a known set of false positives.

7. The method of claim 6, wherein the particular network event is an application-initiated network connection with a host system within the computer network, and wherein the known set of false positives includes an event in which an IP destination address for the network connection is internal to the computer network.

8. The method of claim 1, wherein the particular group of attributes includes a host name attribute indicating a name of the host computer system associated with the particular network event, and wherein the actionability score is decreased in response to the host name attribute being absent from the set of data for the particular network event.

9. The method of claim 1, wherein the particular group of attributes includes an application name attribute indicating an application used by the host computer system during the particular network event, and wherein the actionability score is decreased in response to the application name attribute being absent from the set of data for the particular network event.

10. A non-transitory computer-readable medium having program instructions stored thereon that are capable of causing a computer system to implement operations comprising:
    evaluating a network event that involves a host computer system and occurs within a computer network, including:
       accessing a set of data corresponding to the network event, wherein the set of data includes captured attributes of the network event;
       accessing a suspiciousness score that indicates a likelihood that the network event is suspicious and an actionability score that indicates whether there is sufficient data to take action to remediate the network event, independent of the suspiciousness score for the network event, wherein the actionability is based on an extent to which a particular group of attributes are missing from the set of data for the network event;
       determining a first number of a particular group of attributes that are missing from the set of data;
       adjusting at least the actionability score based on the first number; and
    repeating the evaluating to adjust actionability scores for other network events of a group of network events within the computer network; and
    prioritizing network events within the group of network events for security review based at least on respective adjusted actionability scores for those network events.

11. The non-transitory computer-readable medium of claim 10, further comprising:
    determining a second number of known false positives that match based on the set of data;
    wherein adjusting the actionability score is further based on the second number.

12. The non-transitory computer-readable medium of claim 11, wherein determining the second number of known false positives that match includes determining if one of the captured attributes of the set of data specifies whether a connection for the network event was successful.

13. The non-transitory computer-readable medium of claim 11, wherein adjusting at least the actionability score includes exponentially decreasing the actionability score based on summing the first and second numbers.

14. The non-transitory computer-readable medium of claim 13, wherein adjusting at least the actionability score further includes summing the first and second numbers.

15. The non-transitory computer-readable medium of claim 10, wherein the network event involves the host computer system, and wherein the particular group of attributes includes the following attributes: a host name of the host computer system, a domain name of a domain connected to by the host computer system during the network event, and an application used by the host computer system during the network event.

16. A method, comprising:
- accessing, by a computer system, an alert that specifies attributes of a network event that involves a host computer system and occurs within a computer network;
- scoring, by the computer system, the network event, including by:
  - calculating, using the attributes specified in the alert, a security score for the network event, wherein the security score is indicative of a likelihood that the network event is suspicious;
  - running a set of tests for the alert to generate an actionability score indicative of whether there is sufficient data to take action to remediate the network event, independent of the security score for the network event, wherein the set of tests include first tests indicative of whether the alert includes particular items of information usable to generate an incident report for the alert; and
  - determining, based on the security score and the actionability score, a combined score for the network event; and
- repeating the scoring, by the computer system, to compute combined scores for other network events of a group of network events within the computer network; and
- prioritizing, by the computer system, network events within the group of network events for security review based on respective combined scores for those network events.

17. The method of claim 16, wherein the set of tests includes second tests indicative of whether the alert corresponds to ones of a set of known false positives.

18. The method of claim 17, wherein the first and second tests are binary tests, and wherein the actionability score exponentially decreases based on a number of the first and second tests that indicate inactionability, and wherein the particular items of information usable to generate the incident report include at least a domain name of a domain connected to by the host computer system during the network event.

19. The method of claim 16, wherein the actionability score is calculated according to $\lambda^{\alpha}$, wherein $\lambda$ is a value between 0 to 1, and wherein $\alpha$ indicates a number of the set of tests that indicate inactionability of the alert.

20. The method of claim 19, further comprising:
- separately maintaining a security model for generating the security score and an actionability model for generating the actionability score, wherein the computer system is configured to permit different values of $\lambda$ to calculate actionability scores for different organizations using the computer system.

* * * * *